(12) United States Patent
Feng et al.

(10) Patent No.: US 11,675,115 B2
(45) Date of Patent: Jun. 13, 2023

(54) OPTICAL DEVICES

(71) Applicant: VisEra Technologies Company Limited, Hsin-Chu (TW)

(72) Inventors: Kuo Feng, Kaohsiung (TW); Chin-Chuan Hsieh, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 723 days.

(21) Appl. No.: 16/165,611

(22) Filed: Oct. 19, 2018

(65) Prior Publication Data

US 2020/0124776 A1    Apr. 23, 2020

(51) Int. Cl.
*G02B 5/20*    (2006.01)

(52) U.S. Cl.
CPC ................... *G02B 5/201* (2013.01)

(58) Field of Classification Search
CPC .......... G02B 5/201; G02B 5/203; G02B 5/20; H01L 27/14621; H01L 27/14685
USPC ........................................ 348/270; 250/208.1
See application file for complete search history.

(56) References Cited

U.S. PATENT DOCUMENTS

| 7,701,024 | B2 * | 4/2010 | Kasano | H01L 27/14621 |
| | | | | 257/428 |
| 8,988,565 | B2 * | 3/2015 | Asano | G02B 5/201 |
| | | | | 348/270 |
| 9,564,469 | B2 * | 2/2017 | Kim | H01L 27/14685 |
| 2017/0261368 | A1 | 9/2017 | Nam et al. | |

FOREIGN PATENT DOCUMENTS

| CN | 101335284 B | 5/2011 |
| CN | 104600084 A | 5/2015 |
| JP | 2010204154 A | 9/2010 |
| JP | 2010272654 A | 12/2010 |
| JP | 2013229528 A | 11/2013 |
| TW | I508276 B | 11/2015 |
| WO | WO2011027712 A1 | 3/2011 |

OTHER PUBLICATIONS

Taiwanese Office Action with the search report of its corresponding TW application No. 108116770 dated Feb. 3, 2020; pp. 1-4.

* cited by examiner

*Primary Examiner* — Audrey Y Chang
(74) *Attorney, Agent, or Firm* — Muncy, Geissler, Olds & Lowe, P.C.

(57) ABSTRACT

An optical device is provided. The optical device includes a substrate, a plurality of color filters and a plurality of spacers. The substrate has a central region and a peripheral region. The plurality of color filters include red color filters, green color filters and blue color filters and are formed on the substrate. The plurality of spacers are formed between the color filters. The refractive index of the spacers reduces gradually from that of the spacer located at the central region to that of the spacer located at the peripheral region of the substrate.

15 Claims, 6 Drawing Sheets

OPTICAL DEVICES

BACKGROUND OF THE INVENTION

Field of the Invention

The invention relates to an optical device, and more particularly to an optical device comprising a plurality of low-refractive-index material layers with a gradient refractive index disposed between color filters.

Description of the Related Art

In an optical device with a composite metal grid (CMG)-type structure, a microlens is required above the color filters. In an optical device with a wave guide color filter (WGCF)-type structure, a low-refractive-index material layer surrounding the color filters is used instead of the microlens to form a wave guide structure.

However, in an optical device with a wave guide color filter (WGCF)-type structure, due to the absorption of oblique light by metal grids, the quantum effect (QE) of the current pixel is dropped, especially for pixels located in the peripheral region of the substrate.

Therefore, development of an optical device with a wave guide color filter (WGCF)-type structure capable of improving the quantum effect (QE) and keeping low cross-talk between color filters is desirable.

BRIEF SUMMARY OF THE INVENTION

In accordance with one embodiment of the invention, an optical device is provided. The optical device includes a substrate having an edge; a first color filter having a refractive index and a sidewall formed on the substrate; a second color filter having a refractive index and a sidewall formed on the substrate, the second color filter being closer to the edge of the substrate than the first color filter; a first spacer having a refractive index disposed on the sidewall of the first color filter; and a second spacer having a refractive index disposed on the sidewall of the second color filter, wherein the difference between the refractive index of the second spacer and the refractive index of the second color filter is greater than the difference between the refractive index of the first spacer and the refractive index of the first color filter.

In some embodiments, the first color filter and the second color filter comprise a red color filter, a green color filter or a blue color filter, and the refractive index of the first color filter is the same as that of the second color filter, and the refractive index of the second spacer is less than that of the first spacer.

In some embodiments, the first spacer or the second spacer has a thickness which is in a range from about 100 nm to about 200 nm, and the refractive indexes of the first spacer and the second spacer are in a range from about 1.2 to about 1.5.

In some embodiments, the refractive indexes of the first spacer and the second spacer are less than the refractive index of the first color filter.

In some embodiments, the optical device further comprises a third color filter having a refractive index and a sidewall adjacent to the first color filter, and a fourth color filter having a refractive index and a sidewall adjacent to the second color filter, wherein the third color filter and the fourth color filter comprise a red color filter, a green color filter or a blue color filter.

In some embodiments, the optical device further comprises a third spacer having a refractive index disposed on the sidewall of the third color filter adjacent to the first spacer, and a fourth spacer having a refractive index disposed on the sidewall of the fourth color filter adjacent to the second spacer, wherein the refractive index of the first color filter is the same as that of the second color filter, the refractive index of the third color filter is the same as that of the fourth color filter, the refractive index of the second spacer is less than that of the first spacer, and the refractive index of the fourth spacer is less than that of the third spacer.

In some embodiments, the first spacer and the third spacer or the second spacer and the fourth spacer have a total thickness which is in a range from about 120 nm to about 240 nm, the refractive indexes of the first spacer, the second spacer, the third spacer and the fourth spacer are in a range from about 1.2 to about 1.6.

In some embodiments, the refractive indexes of the first spacer, the second spacer, the third spacer and the fourth spacer are less than the refractive indexes of the first color filter, the second color filter, the third color filter and the fourth color filter.

In some embodiments, the difference between the refractive index of the fourth spacer and the refractive index of the fourth color filter is greater than the difference between the refractive index of the third spacer and the refractive index of the third color filter.

In some embodiments, the optical device further comprises a third color filter having a refractive index and a sidewall located between the first color filter and the second color filter, and a third spacer having a refractive index disposed on the sidewall of the third color filter, the third color filter comprising a red color filter, a green color filter or a blue color filter, wherein the refractive index of the second color filter is greater than that of the third color filter, the refractive index of the third color filter is greater than that of the first color filter, and the refractive indexes of the first spacer, the second spacer and the third spacer are the same.

In some embodiments, the first color filter, the second color filter and the third color filter comprise a low-refractive-index material, a high-refractive-index material or a combination thereof.

In some embodiments, a volume ratio of the high-refractive-index material in the first color filter, the second color filter and the third color filter is in a range from about zero to about one.

In some embodiments, the refractive indexes of the first color filter, the second color filter and the third color filter are in a range from about 1.55 to about 1.95.

In some embodiments, the refractive indexes of the first color filter, the second color filter and the third color filter are greater than the refractive indexes of the first spacer, the second spacer and the third spacer.

In some embodiments, the first spacer, the second spacer or the third spacer has a thickness which is in a range from about 100 nm to about 200 nm, and the refractive indexes of the first spacer, the second spacer and the third spacer are in a range from about 1.2 to about 1.5.

In the present invention, by adjusting the refractive index of the spacers disposed between the color filters, the alteration of the refractive index of such spacers appears a profile that reduces gradually from the refractive index of the spacer located at the central region to the refractive index of the spacer located at the peripheral region of the substrate. Therefore, the difference between the refractive index of the spacers and the refractive index of the color filters (R, G and B) located at the peripheral region of the substrate is large enough to provide a high numerical aperture (NA) of this wave guide structure without a microlens disposed thereon, effectively improving the quantum effect (QE) of the pixels located at the peripheral region of the substrate (i.e. improvement of the optical efficiency response for large-angle incident light).

Similarly, by adding proper amounts of high-refractive-index material to the color filters to adjust the refractive index thereof, the alteration of the refractive index of the color filters appears a profile that increases gradually from the refractive index of the color filters located at the central region to the refractive index of the color filters located at the peripheral region of the substrate. Therefore, the difference between the refractive index of the red (R) color filter, the green (G) color filter and the blue (B) color filter and the refractive index of the spacers located at the peripheral region of the substrate is large enough to provide a high numerical aperture (NA) of this wave guide structure, effectively improving the quantum effect (QE) of the pixels located at the peripheral region of the substrate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
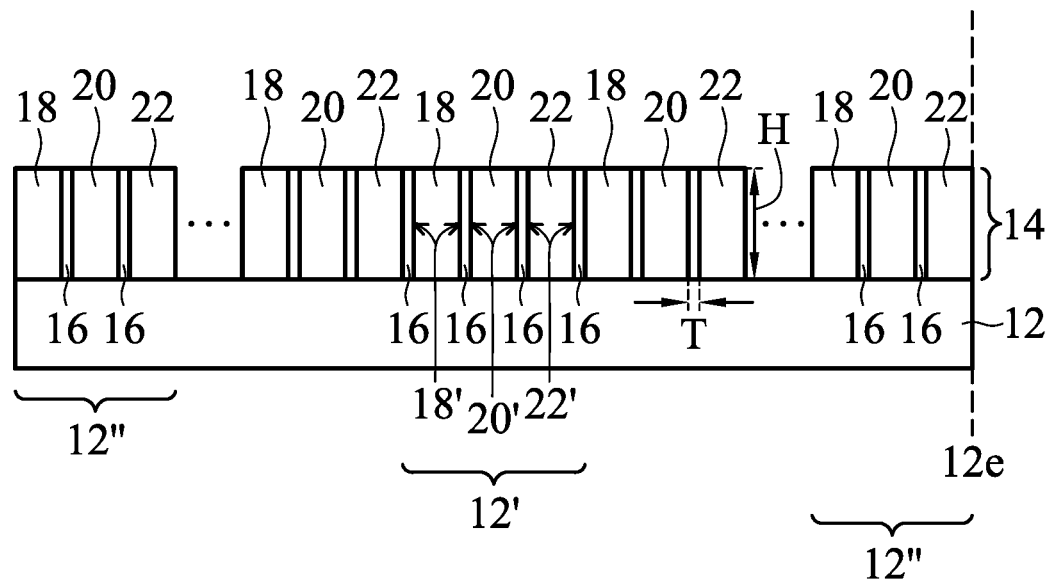
FIG. 1 is a cross-sectional view of an optical device in accordance with one embodiment of the invention.

Referring to FIG. 1, in accordance with one embodiment of the invention, an optical device 10 is provided. FIG. 1 shows a cross-sectional view of the optical device 10.

The optical device 10 comprises a substrate 12 having an edge 12e, a plurality of color filters 14 and a plurality of spacers 16. The substrate 12 has a central region 12' and a peripheral region 12". The plurality of color filters 14 include red color filters 18, green color filters 20 and blue color filters 22, and they are formed on the substrate 12. The color filters 14 located at the peripheral region 12" are closer to the edge 12e of the substrate 12 than the color filters 14 located at the central region 12'. The plurality of spacers 16 are formed between the color filters 14. The spacers 16 are formed on the sidewalls (18', 20' and 22') of the red color filters 18, the green color filters 20 and the blue color filters 22. Specifically, the refractive index of the spacers 16 reduces gradually from the refractive index of the spacer 16 located at the central region 12' to the refractive index of the spacer 16 located at the peripheral region 12" of the substrate 12.

In some embodiments, the height "H" of the color filters 14 is greater than about 1 μm.

In some embodiments, the thickness "T" of the spacers 16 is in a range from about 100 nm to about 200 nm.

In some embodiments, the refractive index of the spacers 16 is in a range from about 1.2 to about 1.5.

In some embodiments, the refractive index of the spacers 16 is less than the refractive index of the red color filters 18, the green color filters 20 and the blue color filters 22.

In some embodiments, the difference between the refractive index of the spacer 16 and the refractive index of the red color filter 18 adjacent to the spacer 16 increases gradually along the central region 12' to the peripheral region 12" of the substrate 12, and the difference therebetween is in a range from about 0.2 to about 0.3.

In some embodiments, the difference between the refractive index of the spacer 16 and the refractive index of the green color filter 20 adjacent to the spacer 16 increases gradually along the central region 12' to the peripheral region 12" of the substrate 12, and the difference therebetween is in a range from about 0.15 to about 0.25.

In some embodiments, the difference between the refractive index of the spacer 16 and the refractive index of the blue color filter 22 adjacent to the spacer 16 increases gradually along the central region 12' to the peripheral region 12" of the substrate 12, and the difference therebetween is in a range from about 0.1 to about 0.2.

Figure 2:
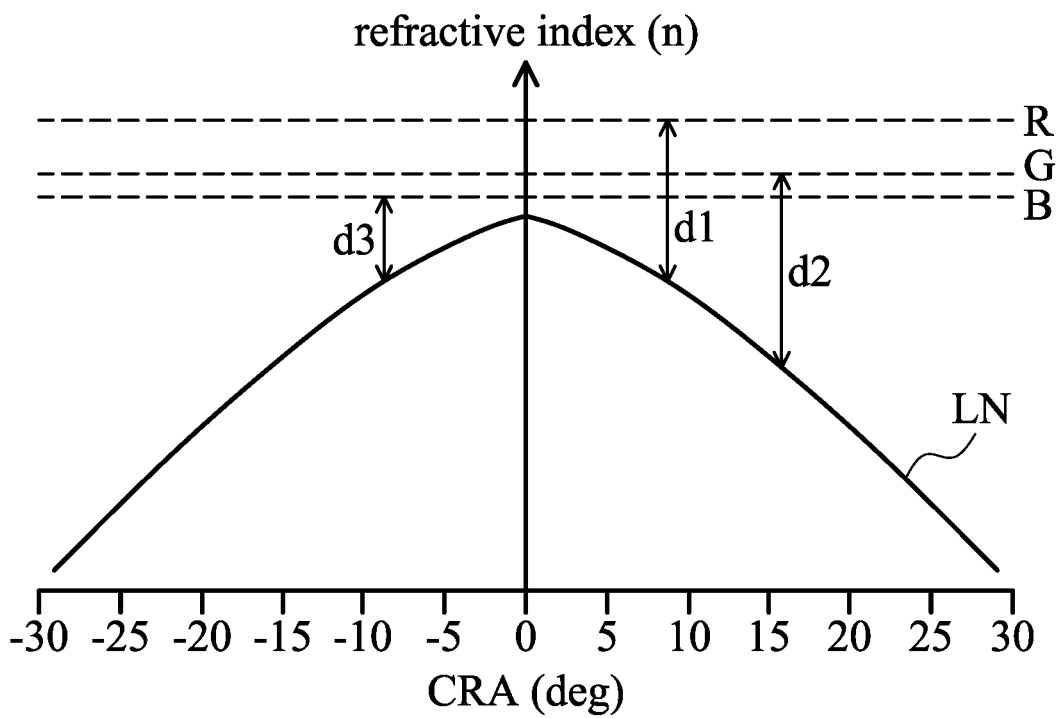
FIG. 2 shows an alteration profile of refractive index of low-refractive-index material layers of an optical device in accordance with one embodiment of the invention.

FIG. 2 shows an alteration profile of the refractive index of the spacers 16 (i.e. low-refractive-index material layers) along the central region 12' to the peripheral region 12" of the substrate 12.

In FIG. 2, the refractive index of the red color filter 18 is about 1.85 (see curve R). The refractive index of the green color filter 20 is about 1.7 (see curve G). The refractive index of the blue color filter 22 is about 1.65 (see curve B). The refractive index of the spacers 16 reduces gradually from the refractive index of the spacer 16 located at the central region 12' (the angle of incident light is about zero degrees in this region) to the refractive index of the spacer 16 located at the peripheral region 12" (the angle of incident light is about 30 degrees in this region) of the substrate 12, and the refractive index of the spacers 16 is in a range from about 1.6 to about 1.2 (see curve LN).

The difference "d1" between the refractive index (as curve LN) of the spacer 16 and the refractive index (as curve R) of the red color filter 18 adjacent to the spacer 16 increases gradually along the central region 12' to the peripheral region 12" of the substrate 12. The difference "d1" is at least in a range from about 0.2 to about 0.3.

The difference "d2" between the refractive index (as curve LN) of the spacer 16 and the refractive index (as curve G) of the green color filter 20 adjacent to the spacer 16 increases gradually along the central region 12' to the peripheral region 12" of the substrate 12. The difference "d2" is at least in a range from about 0.15 to about 0.25.

The difference "d3" between the refractive index (as curve LN) of the spacer 16 and the refractive index (as curve B) of the blue color filter 22 adjacent to the spacer 16 increases gradually along the central region 12' to the peripheral region 12" of the substrate 12. The difference "d3" is at least in a range from about 0.1 to about 0.2.

The difference (d1, d2 and d3) between the refractive index of the spacer 16 and the refractive index of the color filters 14 located at the peripheral region 12" of the substrate 12 is large enough to provide a high numerical aperture (NA) of this wave guide structure, effectively improving the quantum effect (QE) of the pixels located at the peripheral region 12" of the substrate 12.

Figure 3:
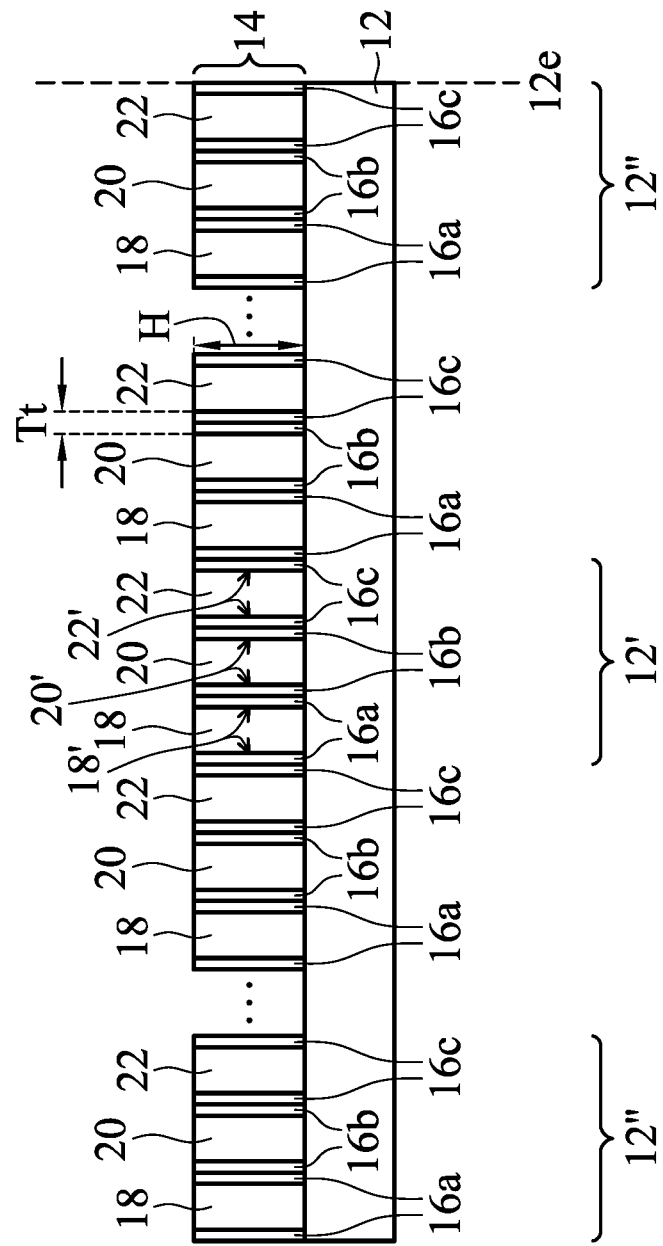
FIG. 3 is a cross-sectional view of an optical device in accordance with one embodiment of the invention.

Referring to FIG. 3, in accordance with one embodiment of the invention, an optical device 10 is provided. FIG. 3 shows a cross-sectional view of the optical device 10.

The optical device 10 comprises a substrate 12 having an edge 12*e*, a plurality of color filters 14, a plurality of first spacers 16*a*, a plurality of second spacers 16*b* and a plurality of third spacers 16*c*. The substrate 12 has a central region 12' and a peripheral region 12". The plurality of color filters 14 comprise red color filters 18, green color filters 20 and blue color filters 22, and they are formed on the substrate 12. The color filters 14 located at the peripheral region 12" are closer to the edge 12*e* of the substrate 12 than the color filters 14 located at the central region 12'. The first spacers 16*a* are formed between the color filters 14, and on the sidewalls 18' of the red color filters 18. Specifically, the refractive index of the first spacers 16*a* reduces gradually from the refractive index of the first spacer 16*a* located at the central region 12' to the refractive index of the first spacer 16*a* located at the peripheral region 12" of the substrate 12.

The second spacers 16*b* are formed between the color filters 14, and on the sidewalls 20' of the green color filters 20. Specifically, the refractive index of the second spacers 16*b* reduces gradually from the refractive index of the second spacer 16*b* located at the central region 12' to the refractive index of the second spacer 16*b* located at the peripheral region 12" of the substrate 12.

The third spacers 16*c* are formed between the color filters 14, and on the sidewalls 22' of the blue color filters 22. Specifically, the refractive index of the third spacers 16*c* reduces gradually from the refractive index of the third spacer 16*c* located at the central region 12' to the refractive index of the third spacer 16*c* located at the peripheral region 12" of the substrate 12.

In some embodiments, the total thickness "Tt" of any two of the first spacer 16*a*, the second spacer 16*b* and the third spacer 16*c* formed between the adjacent color filters 14 is in a range from about 120 nm to about 240 nm. For example, the total thickness of the first spacer 16*a* and the second spacer 16*b* formed between the red color filter 18 and the green color filter 20 adjacent to each other is in a range from about 120 nm to about 240 nm, the total thickness of the first spacer 16*a* and the third spacer 16*c* formed between the red color filter 18 and the blue color filter 22 adjacent to each other is in a range from about 120 nm to about 240 nm, and the total thickness of the second spacer 16*b* and the third spacer 16*c* formed between the green color filter 20 and the blue color filter 22 adjacent to each other is in a range from about 120 nm to about 240 nm.

In some embodiments, the refractive index of the first spacers 16*a* is in a range from about 1.5 to about 1.6.

In some embodiments, the refractive index of the second spacers 16*b* is in a range from about 1.3 to about 1.5.

In some embodiments, the refractive index of the third spacers 16*c* is in a range from about 1.2 to about 1.4.

In some embodiments, the refractive index of the first spacers 16*a*, the second spacers 16*b* and the third spacers 16*c* is less than the refractive index of the red color filters 18, the green color filters 20 and the blue color filters 22.

In some embodiments, the difference between the refractive index of the first spacer 16*a* and the refractive index of the red color filter 18 adjacent to the first spacer 16*a* increases gradually along the central region 12' to the peripheral region 12" of the substrate 12, and the difference therebetween is in a range from about 0.2 to about 0.3.

In some embodiments, the difference between the refractive index of the second spacer 16*b* and the refractive index of the green color filter 20 adjacent to the second spacer 16*b* increases gradually along the central region 12' to the peripheral region 12" of the substrate 12, and the difference therebetween is in a range from about 0.15 to about 0.25.

In some embodiments, the difference between the refractive index of the third spacer 16*c* and the refractive index of the blue color filter 22 adjacent to the third spacer 16*c* increases gradually along the central region 12' to the peripheral region 12" of the substrate 12, and the difference therebetween is in a range from about 0.1 to about 0.2.

Figure 4:
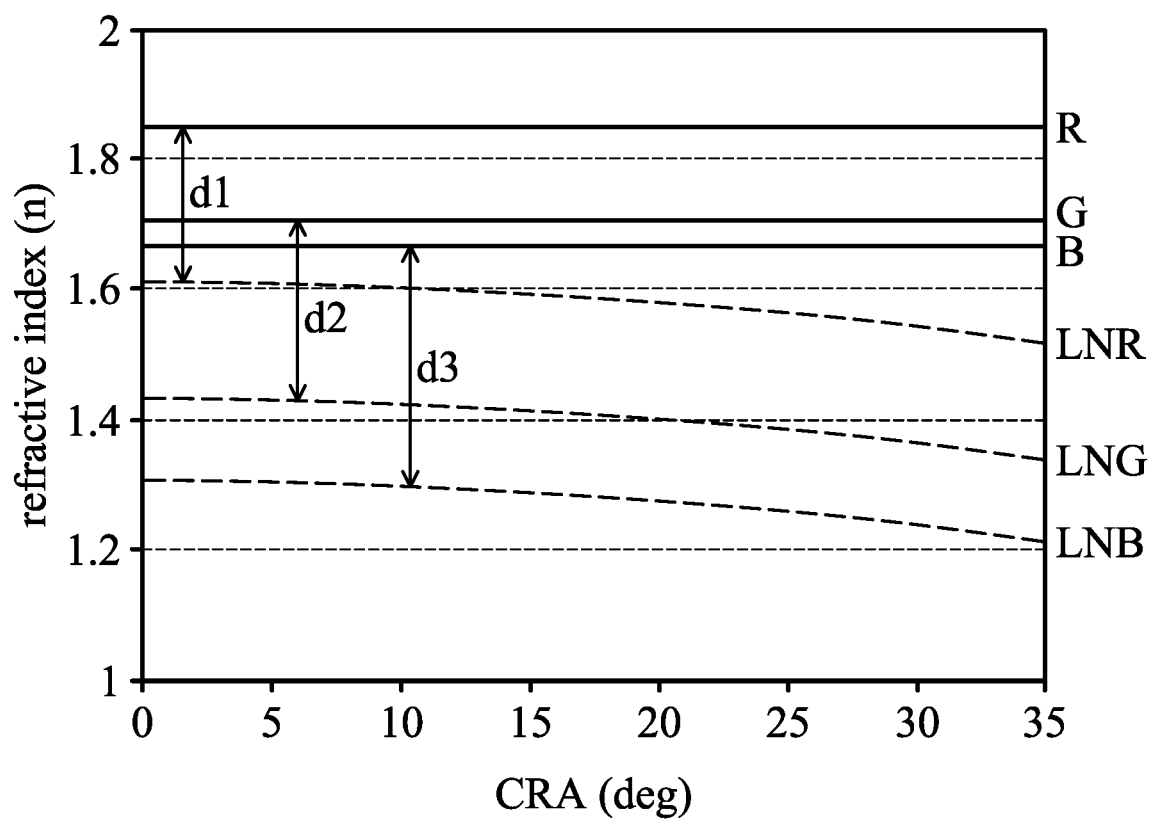
FIG. 4 shows an alteration profile of refractive index of low-refractive-index material layers of an optical device in accordance with one embodiment of the invention.

FIG. 4 shows alteration profiles of the refractive index of the first spacers 16*a*, the second spacers 16*b* and the third spacers 16*c* (i.e. low-refractive-index material layers) along the central region 12' to the peripheral region 12" of the substrate 12.

In FIG. 4, the refractive index of the red color filter 18 is about 1.85 (see curve R). The refractive index of the green color filter 20 is about 1.7 (see curve G). The refractive index of the blue color filter 22 is about 1.65 (see curve B). The refractive index of the first spacers 16*a* reduces gradually from the refractive index of the first spacer 16*a* located at the central region 12' (the angle of incident light is about zero degrees in this region) to the refractive index of the first spacer 16*a* located at the peripheral region 12" (the angle of incident light is about 35 degrees in this region) of the substrate 12, and the refractive index of the first spacers 16*a* is in a range from about 1.6 to about 1.5 (see curve LNR).

The refractive index of the second spacers 16*b* reduces gradually from the refractive index of the second spacer 16*b* located at the central region 12' (the angle of incident light is about zero degrees in this region) to the refractive index of the second spacer 16*b* located at the peripheral region 12" (the angle of incident light is about 35 degrees in this region) of the substrate 12, and the refractive index of the second spacers 16*b* is in a range from about 1.45 to about 1.35 (see curve LNG).

The refractive index of the third spacers 16*c* reduces gradually from the refractive index of the third spacer 16*c* located at the central region 12' (the angle of incident light is about zero degrees in this region) to the refractive index of the third spacer 16*c* located at the peripheral region 12" (the angle of incident light is about 35 degrees in this region) of the substrate 12, and the refractive index of the third spacers 16*c* is in a range from about 1.3 to about 1.2 (see curve LNB).

The difference "d1" between the refractive index (as curve LNR) of the first spacer 16*a* and the refractive index (as curve R) of the red color filter 18 adjacent to the first spacer 16*a* increases gradually along the central region 12' to the peripheral region 12" of the substrate 12. The difference "d1" is at least in a range from about 0.25 to about 0.35.

The difference "d2" between the refractive index (as curve LNG) of the second spacer 16*b* and the refractive index (as curve G) of the green color filter 20 adjacent to the second spacer 16b increases gradually along the central region 12' to the peripheral region 12" of the substrate 12. Furthermore, the difference "d2" is at least in a range from about 0.25 to about 0.35.

The difference "d3" between the refractive index (as curve LNB) of the spacer 16 and the refractive index (as curve B) of the blue color filter 22 adjacent to the spacer 16 increases gradually along the central region 12' to the peripheral region 12" of the substrate 12. The difference "d3" is at least in a range from about 0.35 to about 0.45.

The difference (d1, d2 and d3) between the refractive index of the first spacer 16a, the second spacer 16b and the third spacer 16c and the refractive index of the color filters 14 located at the peripheral region 12" of the substrate 12 is large enough to provide a high numerical aperture (NA) of this wave guide structure, effectively improving the quantum effect (QE) of the pixels located at the peripheral region 12" of the substrate 12.

Figure 5:
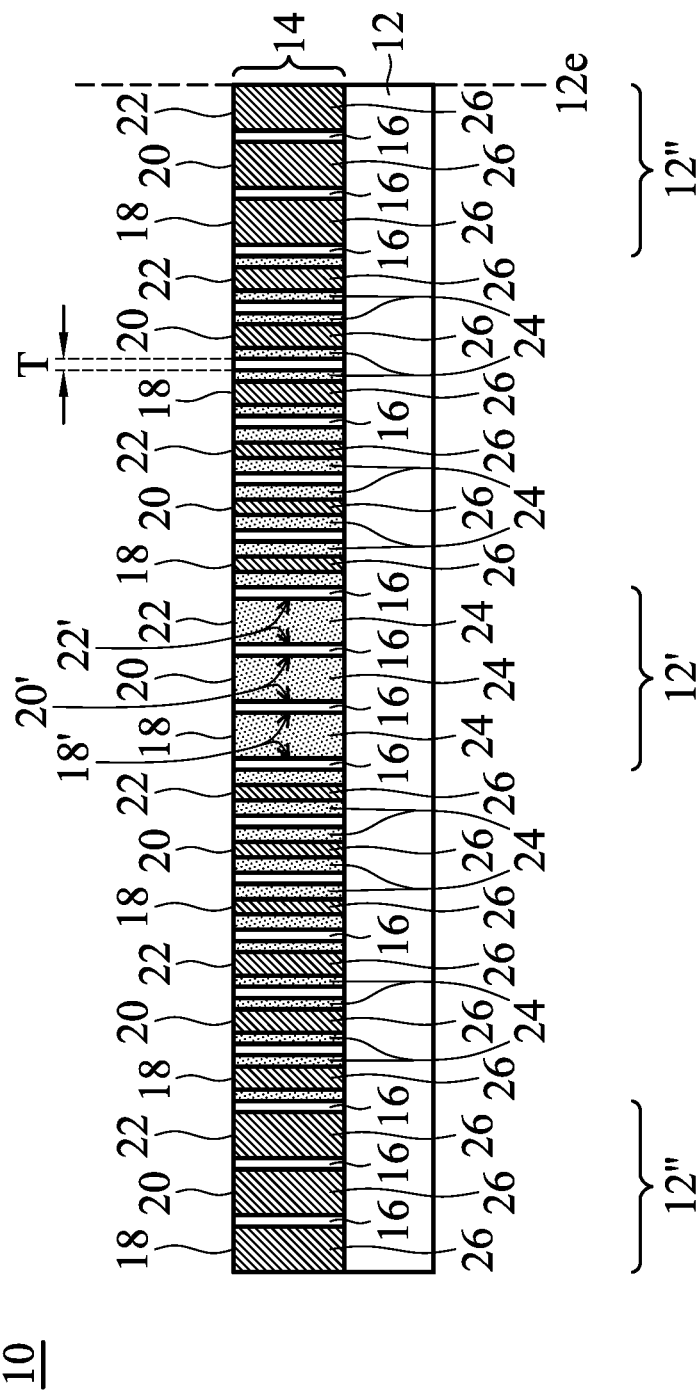
FIG. 5 is a cross-sectional view of an optical device in accordance with one embodiment of the invention.

Referring to FIG. 5, in accordance with one embodiment of the invention, an optical device 10 is provided. FIG. 5 shows a cross-sectional view of the optical device 10.

The optical device 10 comprises a substrate 12 having an edge 12e, a plurality of color filters 14 and a plurality of spacers 16. The substrate 12 has a central region 12' and a peripheral region 12". The plurality of color filters 14 comprise red color filters 18, green color filters 20 and blue color filters 22, and they are formed on the substrate 12. The color filters 14 located at the peripheral region 12" are closer to the edge 12e of the substrate 12 than the color filters 14 located at the central region 12'. Specifically, the refractive index of the red color filters 18 increases gradually from the refractive index of the red color filter 18 located at the central region 12' to the refractive index of the red color filter 18 located at the peripheral region 12" of the substrate 12. The refractive index of the green color filters 20 increases gradually from the refractive index of the green color filter 20 located at the central region 12' to the refractive index of the green color filter 20 located at the peripheral region 12" of the substrate 12. The refractive index of the blue color filters 22 increases gradually from the refractive index of the blue color filter 22 located at the central region 12' to the refractive index of the blue color filter 22 located at the peripheral region 12" of the substrate 12. The plurality of spacers 16 are formed between the color filters 14. The spacers 16 are formed on the sidewalls (18', 20' and 22') of the red color filters 18, the green color filters 20 and the blue color filters 22.

In some embodiments, the red color filters 18, the green color filters 20 and the blue color filters 22 comprise a low-refractive-index material 24, a high-refractive-index material 26 and a combination of the low-refractive-index material 24 and the high-refractive-index material 26.

In some embodiments, a volume ratio of the high-refractive-index material 26 in the red color filters 18, the green color filters 20 and the blue color filters 22 is in a range from about zero to about one.

In some embodiments, when the volume ratio of the high-refractive-index material 26 in the color filters 14 is zero, the red color filters 18, the green color filters 20 or the blue color filters 22 comprises the low-refractive-index material 24.

In some embodiments, when the volume ratio of the high-refractive-index material 26 in the color filters 14 is one, the red color filters 18, the green color filters 20 or the blue color filters 22 comprises the high-refractive-index material 26.

In some embodiments, when the volume ratio of the high-refractive-index material 26 in the color filters 14 is greater than zero and less than one, the red color filters 18, the green color filters 20 or the blue color filters 22 comprises a combination of the low-refractive-index material 24 and the high-refractive-index material 26.

In some embodiments, the refractive index of the red color filters 18 is in a range from about 1.85 to about 1.95.

In some embodiments, the refractive index of the green color filters 20 is in a range from about 1.7 to about 1.8.

In some embodiments, the refractive index of the blue color filters 22 is in a range from about 1.55 to about 1.7.

In some embodiments, the refractive index of the red color filters 18, the green color filters 20 and the blue color filters 22 is greater than the refractive index of the spacers 16.

In some embodiments, the difference between the refractive index of the red color filter 18 and the refractive index of the spacer 16 adjacent to the red color filter 18 increases gradually along the central region 12' to the peripheral region 12" of the substrate 12, and the difference therebetween is in a range from about 0.6 to about 0.7.

In some embodiments, the difference between the refractive index of the green color filter 20 and the refractive index of the spacer 16 adjacent to the green color filter 20 increases gradually along the central region 12' to the peripheral region 12" of the substrate 12, and the difference therebetween is in a range from about 0.4 to about 0.5.

In some embodiments, the difference between the refractive index of the blue color filter 22 and the refractive index of the spacer 16 adjacent to the blue color filter 22 increases gradually along the central region 12' to the peripheral region 12" of the substrate 12, and the difference therebetween is in a range from about 0.3 to about 0.4.

In some embodiments, the thickness "T" of the spacers 16 is in a range from about 100 nm to about 200 nm.

In some embodiments, the refractive index of the spacers 16 is in a range from about 1.2 to about 1.5.

Figure 6:
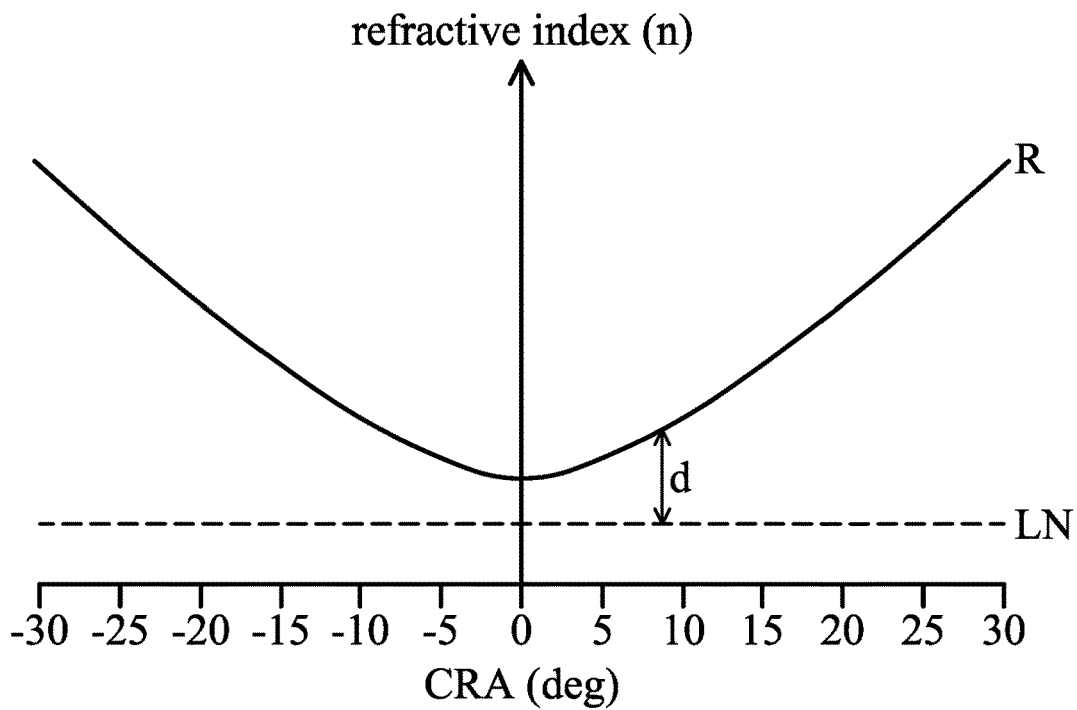
FIG. 6 shows an alteration profile of refractive index of color filters of an optical device in accordance with one embodiment of the invention.

FIG. 6 shows an alteration profile of the refractive index of the color filters 14 (for example, the red color filters 18, the green color filters 20 or the blue color filters 22) along the central region 12' to the peripheral region 12" of the substrate 12.

In FIG. 6, the red color filters 18 are taken as an example. The refractive index of the red color filters 18 increases gradually from the refractive index of the red color filter 18 located at the central region 12' (the angle of incident light is about zero degrees in this region) to the refractive index of the red color filter 18 located at the peripheral region 12" (the angle of incident light is about 30 degrees in this region) of the substrate 12, and the refractive index of the red color filters 18 is in a range from about 1.85 to about 1.95 (see curve R). In addition, the refractive index of the spacers 16 is about 1.23 (see curve LN).

The difference "d" between the refractive index (as curve R) of the red color filter 18 and the refractive index (as curve LN) of the spacer 16 adjacent to the red color filter 18 increases gradually along the central region 12' to the peripheral region 12" of the substrate 12. Furthermore, the difference "d" is at least in a range from about 0.6 to about 0.7.

In some embodiments, the alteration profiles of the refractive index of the green color filters 20 and the blue color filters 22 along the central region 12' to the peripheral region 12" of the substrate 12 are similar to FIG. 6.

The difference "d" between the refractive index of the red color filter 18 and the refractive index of the spacer 16 located at the peripheral region 12″ of the substrate 12 is large enough to provide a high numerical aperture (NA) of this wave guide structure, effectively improving the quantum effect (QE) of the pixels located at the peripheral region 12″ of the substrate 12.

Figure 7:
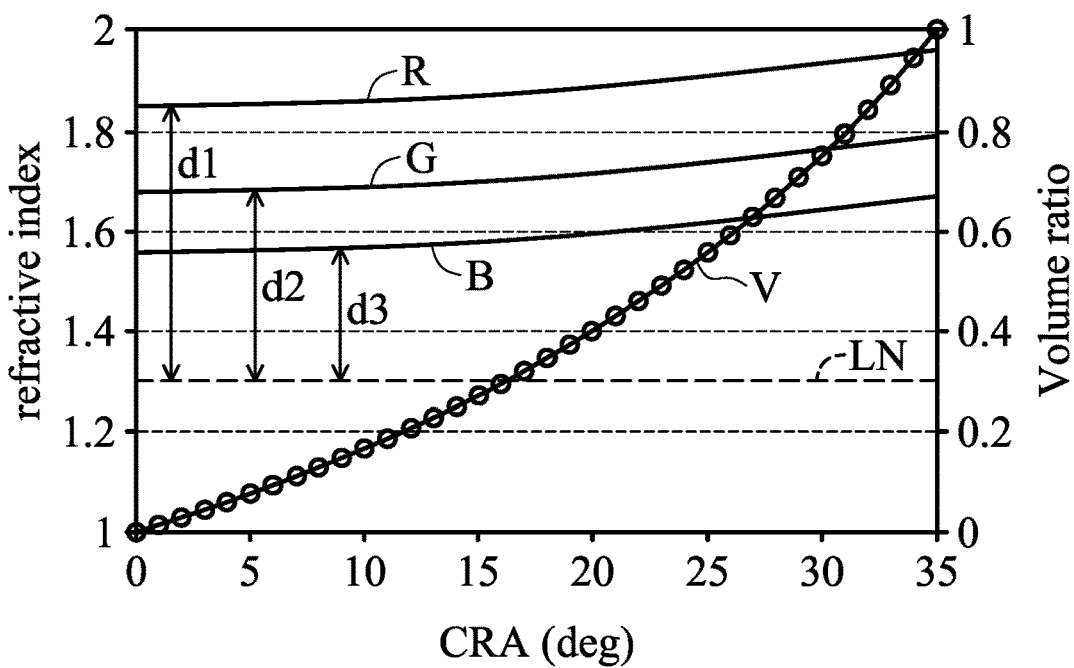
FIG. 7 shows an alteration profile of refractive index and composition of color filters of an optical device in accordance with one embodiment of the invention.

FIG. 7 shows alteration profiles of the refractive index of the red color filters 18, the green color filters 20 and the blue color filters 22 along the central region 12′ to the peripheral region 12″ of the substrate 12.

In FIG. 7, the refractive index of the spacers 16 is about 1.3 (see curve LN). The refractive index of the red color filters 18 increases gradually from the refractive index of the red color filter 18 located at the central region 12′ (the angle of incident light is about zero degrees in this region) to the refractive index of the red color filter 18 located at the peripheral region 12″ (the angle of incident light is about 35 degrees in this region) of the substrate 12. The refractive index of the red color filters 18 is in a range from about 1.85 to about 1.95 (see curve R).

The refractive index of the green color filters 20 increases gradually from the refractive index of the green color filter 20 located at the central region 12′ (the angle of incident light is about zero degrees in this region) to the refractive index of the green color filter 20 located at the peripheral region 12″ (the angle of incident light is about 35 degrees in this region) of the substrate 12. The refractive index of the green color filters 20 is in a range from about 1.7 to about 1.8 (see curve G).

The refractive index of the blue color filters 22 increases gradually from the refractive index of the blue color filter 22 located at the central region 12′ (the angle of incident light is about zero degrees in this region) to the refractive index of the blue color filter 22 located at the peripheral region 12″ (the angle of incident light is about 35 degrees in this region) of the substrate 12. The refractive index of the blue color filters 22 is in a range from about 1.55 to about 1.65 (see curve B).

The difference "d1" between the refractive index (as curve R) of the red color filter 18 and the refractive index (as curve LN) of the spacer 16 adjacent to the red color filter 18 increases gradually along the central region 12′ to the peripheral region 12″ of the substrate 12. Furthermore, the difference "d1" is at least in a range from about 0.55 to about 0.65.

The difference "d2" between the refractive index (as curve G) of the green color filter 20 and the refractive index (as curve LN) of the spacer 16 adjacent to the green color filter 20 increases gradually along the central region 12′ to the peripheral region 12″ of the substrate 12. Furthermore, the difference "d2" is at least in a range from about 0.4 to about 0.5.

The difference "d3" between the refractive index (as curve B) of the blue color filter 22 and the refractive index (as curve LN) of the spacer 16 adjacent to the blue color filter 22 increases gradually along the central region 12′ to the peripheral region 12″ of the substrate 12. Furthermore, the difference "d3" is at least in a range from about 0.25 to about 0.35.

The difference (d1, d2 and d3) between the refractive index of the red color filter 18, the green color filter 20 and the blue color filter 22 and the refractive index of the spacers 16 located at the peripheral region 12″ of the substrate 12 is large enough to provide a high numerical aperture (NA) of this wave guide structure, effectively improving the quantum effect (QE) of the pixels located at the peripheral region 12″ of the substrate 12.

In addition, the volume ratio of the high-refractive-index material 26, respectively, in the red color filters 18, the green color filters 20 and the blue color filters 22 is in a range from about zero to about one which increases gradually from the volume ratio of the high-refractive-index material 26 in the color filters located at the central region to that of the high-refractive-index material 26 in the color filters located at the peripheral region of the substrate (see curve V).

Example 1

QE Improvement of the Optical Device

Figure 8:
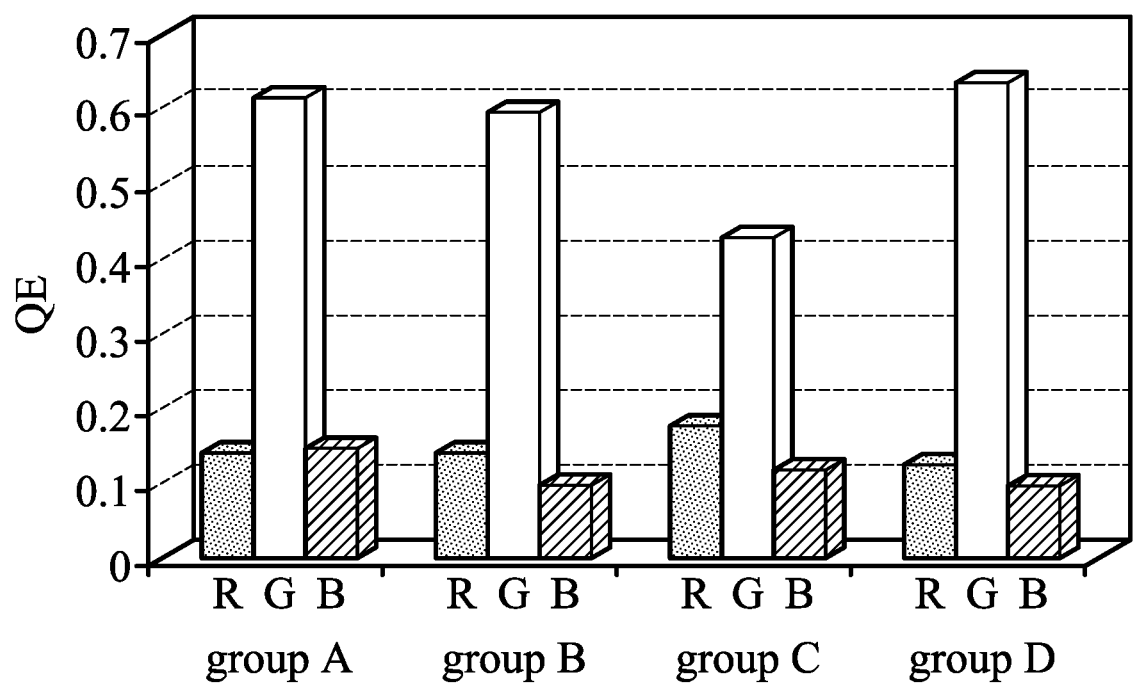
FIG. 8 shows QE data of an optical device in accordance with one embodiment of the invention.

In this example, QE improvement, especially for a green color filter located at a peripheral region of a substrate, is acknowledged by adjusting the difference of the refractive index between the low-refractive-index material layer and the color filter surrounded by the low-refractive-index material layer. FIG. 8 shows the variation of QE when the refractive index of the low-refractive-index material layer or the color filter is adjusted. In FIG. 8, in the groups "A", "B" and "C", the refractive index of the low-refractive-index material layer is merely adjusted.

In the group "A", the refractive index of the low-refractive-index material layer is about 1.2-1.3. The refractive index of the green color filter surrounded by the low-refractive-index material layer is about 1.7. Therefore, the difference between the refractive index of the low-refractive-index material layer and the refractive index of the green color filter is about 0.4-0.5.

In the group "B", the refractive index of the low-refractive-index material layer is about 1.45. The refractive index of the green color filter surrounded by the low-refractive-index material layer is about 1.7. Therefore, the difference between the refractive index of the low-refractive-index material layer and the refractive index of the green color filter is about 0.25.

In the group "C", the refractive index of the low-refractive-index material layer is about 1.58. The refractive index of the green color filter surrounded by the low-refractive-index material layer is about 1.7. Therefore, the difference between the refractive index of the low-refractive-index material layer and the refractive index of the green color filter is about 0.12.

Apparently, as the difference between the refractive index of the low-refractive-index material layer and the refractive index of the green color filter enlarges, the QE of the green color filter is getting better. For example, the green color filter in the group "A" shows the greatest QE among the groups "A", "B" and "C".

In addition, in the group "D", the refractive index of the color filter is merely adjusted. The refractive index of the green color filter is about 1.8 (adding a proper amount of a high-refractive-index material). The refractive index of the low-refractive-index material layer surrounding the green color filter is about 1.45. Therefore, the difference between the refractive index of the green color filter and the refractive index of the low-refractive-index material layer is about 0.35.

Similarly, as the difference between the refractive index of the green color filter and the refractive index of the low-refractive-index material layer enlarges, the QE of the green color filter is getting better. For example, the green color filter in the group "D" shows a greater QE than that of the green color filter in the group "A".

In the present invention, by adjusting the refractive index of the spacers disposed between the color filters, the alteration of the refractive index of such spacers appears a profile that reduces gradually from the refractive index of the spacer located at the central region to the refractive index of the spacer located at the peripheral region of the substrate. Therefore, the difference between the refractive index of the spacers and the refractive index of the color filters (R, G and B) located at the peripheral region of the substrate is large enough to provide a high numerical aperture (NA) of this wave guide structure without a microlens disposed thereon, effectively improving the quantum effect (QE) of the pixels located at the peripheral region of the substrate (i.e. improvement of the optical efficiency response for large-angle incident light).

Similarly, by adding proper amounts of high-refractive-index material to the color filters to adjust the refractive index thereof, the alteration of the refractive index of the color filters appears a profile that increases gradually from the refractive index of the color filters located at the central region to the refractive index of the color filters located at the peripheral region of the substrate. Therefore, the difference between the refractive index of the red (R) color filter, the green (G) color filter and the blue (B) color filter and the refractive index of the spacers located at the peripheral region of the substrate is large enough to provide a high numerical aperture (NA) of this wave guide structure, effectively improving the quantum effect (QE) of the pixels located at the peripheral region of the substrate.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
    a substrate having an edge;
    a first color filter having a refractive index and a sidewall formed on the substrate;
    a second color filter having a refractive index and a sidewall formed on the substrate, the second color filter being closer to the edge of the substrate than the first color filter;
    a first spacer having a refractive index disposed on the sidewall of the first color filter; and
    a second spacer having a refractive index disposed on the sidewall of the second color filter,
    wherein the difference between the refractive index of the second spacer and the refractive index of the second color filter is greater than the difference between the refractive index of the first spacer and the refractive index of the first color filter.

2. The optical device as claimed in claim 1, wherein the first color filter and the second color filter comprise a red color filter, a green color filter or a blue color filter, and the refractive index of the first color filter is the same as that of the second color filter, and the refractive index of the second spacer is less than that of the first spacer.

3. The optical device as claimed in claim 2, wherein the first spacer or the second spacer has a thickness which is in a range from about 100 nm to about 200 nm, and the refractive indexes of the first spacer and the second spacer are in a range from about 1.2 to about 1.5.

4. The optical device as claimed in claim 2, wherein the refractive indexes of the first spacer and the second spacer are less than the refractive index of the first color filter.

5. The optical device as claimed in claim 1, further comprising a third color filter having a refractive index and a sidewall adjacent to the first color filter, and a fourth color filter having a refractive index and a sidewall adjacent to the second color filter, wherein the third color filter and the fourth color filter comprise a red color filter, a green color filter or a blue color filter.

6. The optical device as claimed in claim 5, further comprising a third spacer having a refractive index disposed on the sidewall of the third color filter adjacent to the first spacer, and a fourth spacer having a refractive index disposed on the sidewall of the fourth color filter adjacent to the second spacer, wherein the refractive index of the first color filter is the same as that of the second color filter, the refractive index of the third color filter is the same as that of the fourth color filter, the refractive index of the second spacer is less than that of the first spacer, and the refractive index of the fourth spacer is less than that of the third spacer.

7. The optical device as claimed in claim 6, wherein the first spacer and the third spacer or the second spacer and the fourth spacer have a total thickness which is in a range from about 120 nm to about 240 nm, the refractive indexes of the first spacer, the second spacer, the third spacer and the fourth spacer are in a range from about 1.2 to about 1.6.

8. The optical device as claimed in claim 6, wherein the refractive indexes of the first spacer, the second spacer, the third spacer and the fourth spacer are less than the refractive indexes of the first color filter, the second color filter, the third color filter and the fourth color filter.

9. The optical device as claimed in claim 6, wherein the difference between the refractive index of the fourth spacer and the refractive index of the fourth color filter is greater than the difference between the refractive index of the third spacer and the refractive index of the third color filter.

10. The optical device as claimed in claim 1, further comprising a third color filter having a refractive index and a sidewall located between the first color filter and the second color filter, and a third spacer having a refractive index disposed on the sidewall of the third color filter, the third color filter comprising a red color filter, a green color filter or a blue color filter, wherein the refractive index of the second color filter is greater than that of the third color filter, the refractive index of the third color filter is greater than that of the first color filter, and the refractive indexes of the first spacer, the second spacer and the third spacer are the same.

11. The optical device as claimed in claim 10, wherein the first color filter, the second color filter and the third color filter comprise a low-refractive-index material, a high-refractive-index material or a combination thereof.

12. The optical device as claimed in claim 11, wherein a volume ratio of the high-refractive-index material in the first color filter, the second color filter and the third color filter is in a range from about zero to about one.

13. The optical device as claimed in claim 10, wherein the refractive indexes of the first color filter, the second color filter and the third color filter are in a range from about 1.55 to about 1.95.

14. The optical device as claimed in claim 10, wherein the refractive indexes of the first color filter, the second color filter and the third color filter are greater than the refractive indexes of the first spacer, the second spacer and the third spacer.

15. The optical device as claimed in claim 10, wherein the first spacer, the second spacer or the third spacer has a thickness which is in a range from about 100 nm to about 200 nm, and the refractive indexes of the first spacer, the second spacer and the third spacer are in a range from about 1.2 to about 1.5.

\* \* \* \* \*